US012682935B2

(12) United States Patent
Arai et al.

(10) Patent No.: US 12,682,935 B2
(45) Date of Patent: Jul. 14, 2026

(54) HARD DISK DRIVE EMBEDDED GASKET BASE

(71) Applicant: Western Digital Technologies, Inc., San Jose, CA (US)

(72) Inventors: Yuichi Arai, Kawasaki (JP); Yoshiyuki Hirono, Chigasaki (JP); Takashi Tomita, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/609,706

(22) Filed: Mar. 19, 2024

(65) Prior Publication Data

US 2025/0299703 A1 Sep. 25, 2025

(51) Int. Cl.
G11B 33/14 (2006.01)

(52) U.S. Cl.
CPC ................................. G11B 33/1466 (2013.01)

(58) Field of Classification Search
None
See application file for complete search history.

(56) References Cited

U.S. PATENT DOCUMENTS

| | | | | |
|---|---|---|---|---|
| 4,660,110 | A * | 4/1987 | Iida | G11B 17/038 |
| | | | | 360/97.16 |
| 5,282,101 | A | 1/1994 | Reinisch | |
| 5,422,766 | A * | 6/1995 | Hack | G11B 33/1466 |
| | | | | 360/99.18 |
| 6,665,139 | B2 * | 12/2003 | Tokuyama | G11B 5/6005 |

| | | | | |
|---|---|---|---|---|
| 6,769,699 | B2 * | 8/2004 | Seki | G11B 33/1466 |
| | | | | 277/637 |
| 7,852,601 | B1 | 12/2010 | Little | |
| 9,818,454 | B1 * | 11/2017 | Albrecht | G11B 33/1466 |
| 10,622,027 | B1 * | 4/2020 | Kaneko | G11B 33/1466 |
| 10,699,753 | B2 | 6/2020 | Lee et al. | |
| 10,902,885 | B2 | 1/2021 | Sato | |
| 11,348,619 | B2 * | 5/2022 | Arai | G11B 33/1466 |
| 11,615,810 | B1 | 3/2023 | Chan et al. | |
| 11,842,754 | B2 | 12/2023 | Arai et al. | |
| 12,322,413 | B2 * | 6/2025 | Mitsunari | G11B 33/027 |

(Continued)

FOREIGN PATENT DOCUMENTS

| | | | |
|---|---|---|---|
| JP | 2020047343 A | 3/2020 | |
| KR | 20130015156 A * | 2/2013 | G11B 19/2009 |

(Continued)

OTHER PUBLICATIONS

Data Recovery Salon, Base Casting and Top Cover Of Hard Disk, downloaded at https://www.datarecoverytools.co.uk/data-recovery-vocabulary/vocabulary-a-e/base-casting-and-top-cover-of-hard-disk/ at least as early as Dec. 19, 2023.

*Primary Examiner* — William J Klimowicz
(74) *Attorney, Agent, or Firm* — John D. Henkhaus

(57) ABSTRACT

A hard disk drive enclosure base includes a groove extending from an internal sidewall surface into the sidewall and a gasket seal embedded in the groove. In the context of progressively larger recording disk diameters, corresponding expanding disk shrouds, and corresponding narrower baseplate sidewalls, such a baseplate is configured to enable a first cover to physically engage with a portion of the embedded gasket seal that extends inward away from the sidewall surface, thereby providing a suitable drive sealing mechanism.

14 Claims, 8 Drawing Sheets

3 O'CLOCK (0°)
12 O'CLOCK (90°)
9 O'CLOCK (180°)

3 O'CLOCK (0°)
12 O'CLOCK (90°)
9 O'CLOCK (180°)

(56) References Cited

U.S. PATENT DOCUMENTS

| | | | |
|---|---|---|---|
| 2004/0099987 A1 | 5/2004 | Imai et al. | |
| 2009/0073328 A1* | 3/2009 | Gunderson | G11B 33/1466 |
| | | | 349/1 |
| 2015/0009789 A1* | 1/2015 | Freeman | G11B 33/1466 |
| | | | 369/75.11 |
| 2018/0047430 A1* | 2/2018 | Albrecht | G11B 33/1466 |
| 2020/0118601 A1* | 4/2020 | Lee | G11B 25/043 |
| 2022/0020399 A1* | 1/2022 | Arai | G11B 33/148 |
| 2024/0170018 A1* | 5/2024 | Mitsunari | G11B 25/043 |

FOREIGN PATENT DOCUMENTS

| | | | |
|---|---|---|---|
| WO | 0221534 A1 | 3/2002 | |
| WO | 2017163885 A1 | 9/2017 | |
| WO | WO-2023027070 A1 * | 3/2023 | G11B 33/1466 |

* cited by examiner

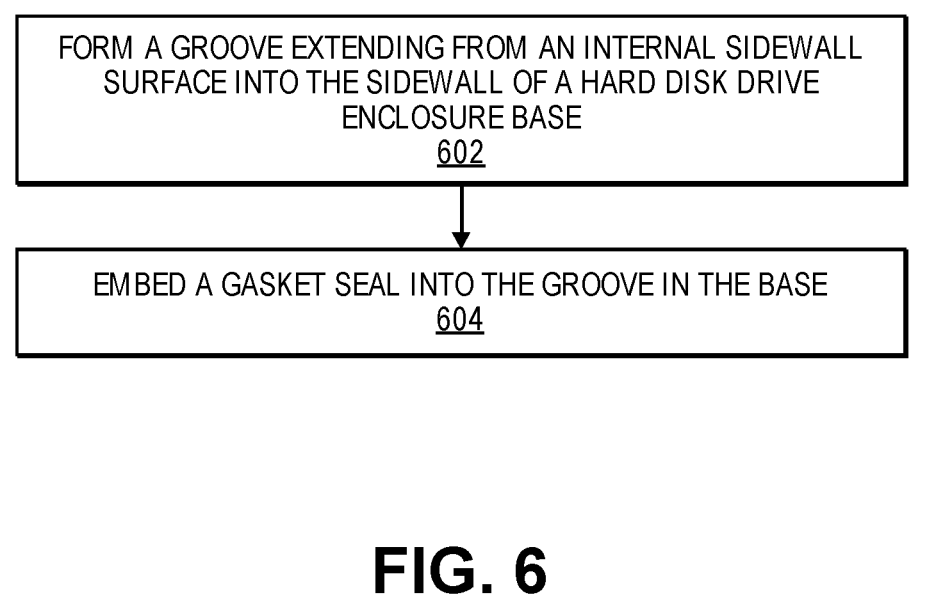

```
┌─────────────────────────────────────────────────────┐
│  FORM A GROOVE EXTENDING FROM AN INTERNAL SIDEWALL    │
│   SURFACE INTO THE SIDEWALL OF A HARD DISK DRIVE      │
│                 ENCLOSURE BASE                        │
│                      602                              │
└─────────────────────────────────────────────────────┘
                         │
                         ▼
┌─────────────────────────────────────────────────────┐
│   EMBED A GASKET SEAL INTO THE GROOVE IN THE BASE     │
│                      604                              │
└─────────────────────────────────────────────────────┘
```

FIG. 6

HARD DISK DRIVE EMBEDDED GASKET BASE

FIELD OF EMBODIMENTS

Embodiments of the invention may relate generally to hard disk drives, and particularly to approaches to embedding gasket seal directly on the base plate.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

As networked computing systems grow in numbers and capability, there is a need for more data storage system capacity. Cloud computing and large-scale data processing further increase the need for digital data storage systems that are capable of transferring and holding significant amounts of data. To that end, increasing the storage capacity of HDDs is one of the on-going goals of HDD technology evolution. In one form, this goal manifests in increasing the diameter of disks incorporated into a given HDD, thus providing more disk surface area for data storage.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 6 is a flowchart illustrating a method of manufacturing a hard disk drive enclosure base, according to an embodiment.

DETAILED DESCRIPTION

Figure 1:
FIG. 1 is a plan view illustrating a hard disk drive, according to an embodiment.

Generally, approaches to an embedded gasket baseplate, such as for a hard disk drive, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free.

Context

Recall that increasing the storage capacity of HDDs is one of the on-going goals of HDD technology evolution, and that increasing the disk diameter to provide more disk storage area is one approach to increasing storage capacity. Recently, some HDD designs may have already transitioned from 95 millimeter (mm) disks to 97 mm disks. However, for even higher capacity HDDs without increasing the number of disks, even larger size disks (e.g., 98 mm, 99 mm) may be considered. One issue with increasing the disk diameter, however, is that the gasket (seal) space for sealing the HDD cover to the enclosure baseplate becomes narrower such as at the 3 o'clock, 9 o'clock, and 12 o'clock positions.

Furthermore, storage system owners/operators prefer HDDs having lower power consumption to save on operating costs. A disk shroud refers to the structural surface(s) positioned within the interior space and proximate the disk stack such that the shroud substantially circumscribes the circumference of the disks for an arc of a certain span, typically less than the full 360 degrees to make room for the head-stack assembly (HSA) to operate upon the disks. The shroud-to-disk clearance (or "disk shroud clearance") was historically typically continuous and constant (i.e., uniform) around the perimeter of the disks, and is typically kept as tight as possible to reduce disk flutter, especially for air-based products. However, such a tight clearance creates more windage drag that requires the spindle motor to use more power. In helium-based (or other lighter-than air gas) drives, there is little to no risk of disk flutter, but the clearance is typically still kept very narrow due to the tradition carried over from the air drives. Widening the disk shroud clearance is one approach to reducing the shear stress exerted at the disk rims (or "edges"), thereby reducing the windage torque and drag and power consumption. In general, the wider the shroud clearance, the lower the windage drag until the curve flattens (e.g., at around 3 mm gap). However, progressively larger disk diameters (e.g., 97 mm for some products) push the thickness limitation of the baseplate at the 3 o'clock, 9 o'clock, and 12 o'clock positions where the drive form factor is especially constraining, and conflict with the need for a seal land (or "seat") surface for applying the gasket seal around the perimeter of the inner cavity of the baseplate.

Figure 2A:
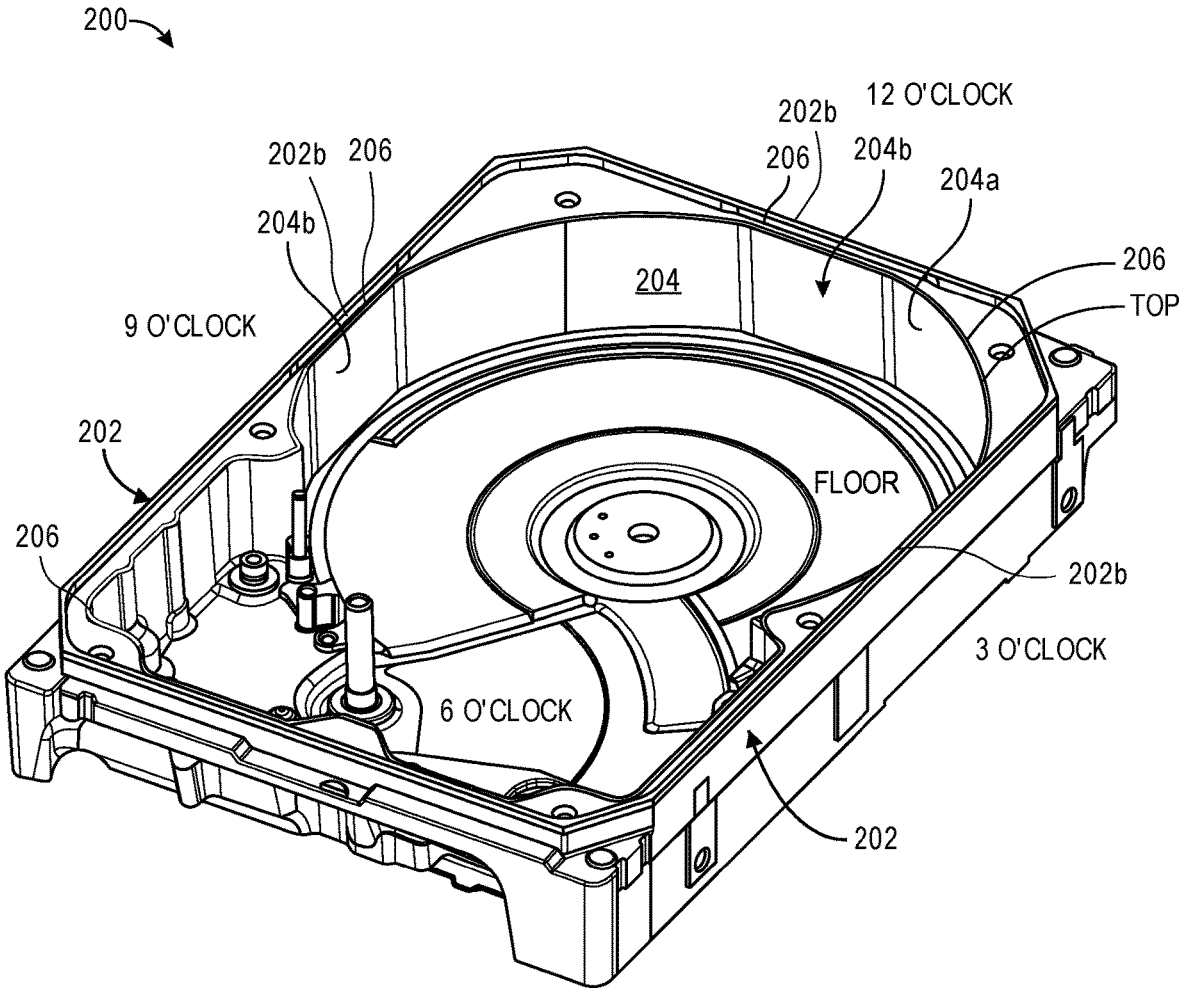
FIG. 2A is a perspective view illustrating a hard disk drive baseplate having a non-uniform disk shroud, according to an embodiment.

FIG. 2A is a perspective view illustrating a hard disk drive baseplate having a non-uniform disk shroud, according to an embodiment. Enclosure base 200 (or "baseplate 200" or simply "base 200"), which is configured to house internal components of a hard disk drive (HDD) such as the recording disks, actuator arm assembly, head sliders, etc., comprises an internal non-uniform disk shroud structure, disk shroud 204. Baseplate 200 is referred to herein as having a non-uniform disk shroud in that it has a non-uniform, non-constant radius and thus a non-uniform or non-constant gap with the outer edges or rims of the corresponding recording disk(s) of a disk stack (not shown here; see, e.g., disk medium 120 of FIG. 1). Being non-uniform, disk shroud 204 comprises a first portion 204a having a first clearance (or "gap") to an outer edge of the disk media and a second portion 204b having a different second clearance to the outer edge of the disk media. Here, the first and second clearances corresponding to the first and second portions 204a, 204b of the disk shroud 204 would be in relation to the plane of the disk medium, i.e., a distance between the disk medium edge and the disk shroud 204. The positions of the second portion(s) 204b of the disk shroud 204 correspond to or coincide with narrower portion(s) 202b of the sidewall 202 of the baseplate 200.

According to an embodiment and as depicted, portion(s) 202b, 204b are positioned at a plurality of certain positions or locations along the baseplate 200 sidewall 202 and the disk shroud 204. That is, these portions may be positioned at the at the 3 o'clock (or 0°), 12 o'clock (or 90°), and 9 o'clock (or 180°) positions (where for reference the area in which there is no shroud 204, in the lower portion of FIG. 2A where an actuator operates, includes a 6 o'clock or 270° position). At these locations the drive form factor is especially constraining because of the need for a seat or seating surface for a gasket 206 seal around the perimeter of the main cavity of the base 200, in view of the limited space for the base sidewall 202 in such locations for a given form factor.

Figures 2B, 2C:
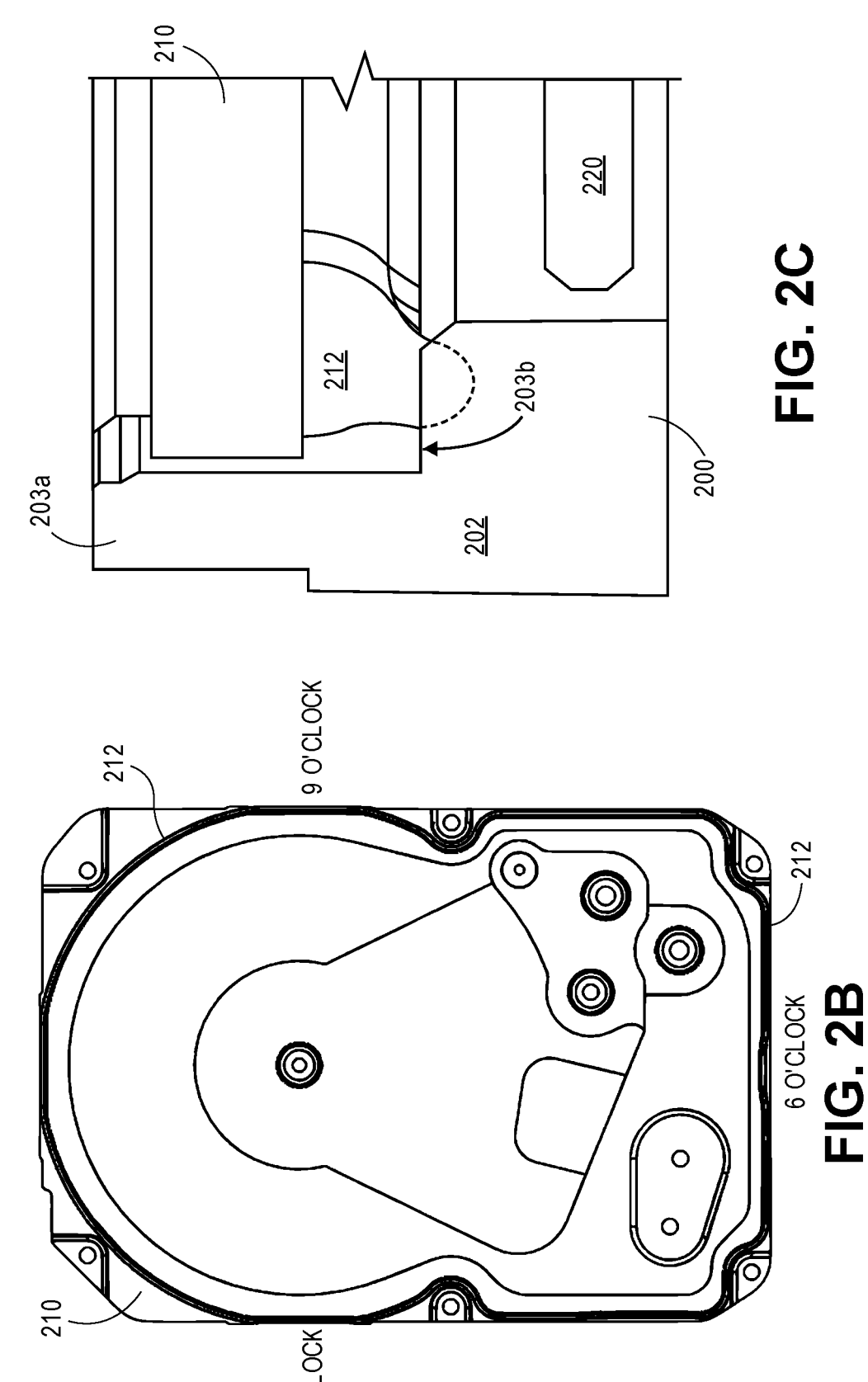
FIG. 2B is a bottom plan view illustrating a cover for the baseplate of FIG. 2A, according to an embodiment.
FIG. 2C is a cross-sectional view illustrating a sidewall rib of the baseplate of FIG. 2A, according to an embodiment.

FIG. 2B is a bottom plan view illustrating a cover for the baseplate of FIG. 2A, according to an embodiment. Cover 210 (or "first cover 210") comprises a gasket 212 positioned generally around the perimeter of the cover 210. Gasket 212 functions as a sealing mechanism (or simply "seal") between the first cover 210 and the baseplate 200 (FIG. 2A). According to an embodiment, gasket 212 is a CIPG (cured-in-place gasket) type seal, whereby the gasket material is applied onto the baseplate 200 and then UV (ultraviolet) cured. Here, a CIPG gasket seal facilitates removability of the overlying first cover 210. Typically, an HDD is provisioned with either a gasket applied to a baseplate such as gasket 206 of baseplate 200 (FIG. 2A), or a gasket applied to a cover such as gasket 212 of cover 210, so FIGS. 2A-2B may be considered as alternative approaches to sealing a first cover 210 to a baseplate 200. In either case, gasket 206, 212 is shaped to conform to the sidewall land or seat generally around the baseplate 200/cover 210 perimeter, and where such baseplate 200 sidewall 202 gasket seat is typically narrower at the 3 o'clock, 9 o'clock, and 12 o'clock positions, i.e., at portions 202b (FIG. 2A) of baseplate 200.

Furthermore, in the context of a hermetically-sealed HDD in which a lighter-than-air gas (e.g., helium) is enclosed therein, a second cover (not shown) is typically welded to the baseplate 200 over the first cover 210 to hermetically seal the gas within the HDD. Therefore, space is needed on the baseplate 200 sidewall for coupling the second cover thereto, where the upper surface of such sidewall configured for receiving the second cover is referred to herein as a "weld rib" (or simply "rib"). FIG. 2C is a cross-sectional view illustrating a sidewall rib of the baseplate of FIG. 2A, according to an embodiment. The cross-sectional view of FIG. 2C illustrates the scenario corresponding to the 3 o'clock, 9 o'clock, and 12 o'clock positions, i.e., at sidewall portion(s) 202b (FIG. 2A). Here, in the context of a 97 mm or lesser recording disk 220 diameter, as depicted there is ample overlapping space between the cover 210 and the baseplate 200 sidewall 202, i.e., inside of the rib 203a, so that a suitable seal is achievable with gasket 212 on seat 203b of baseplate 200.

Approaches to Sealing First Cover in Context of Larger Diameter Disks

Figures 3A, 3B, 3C:
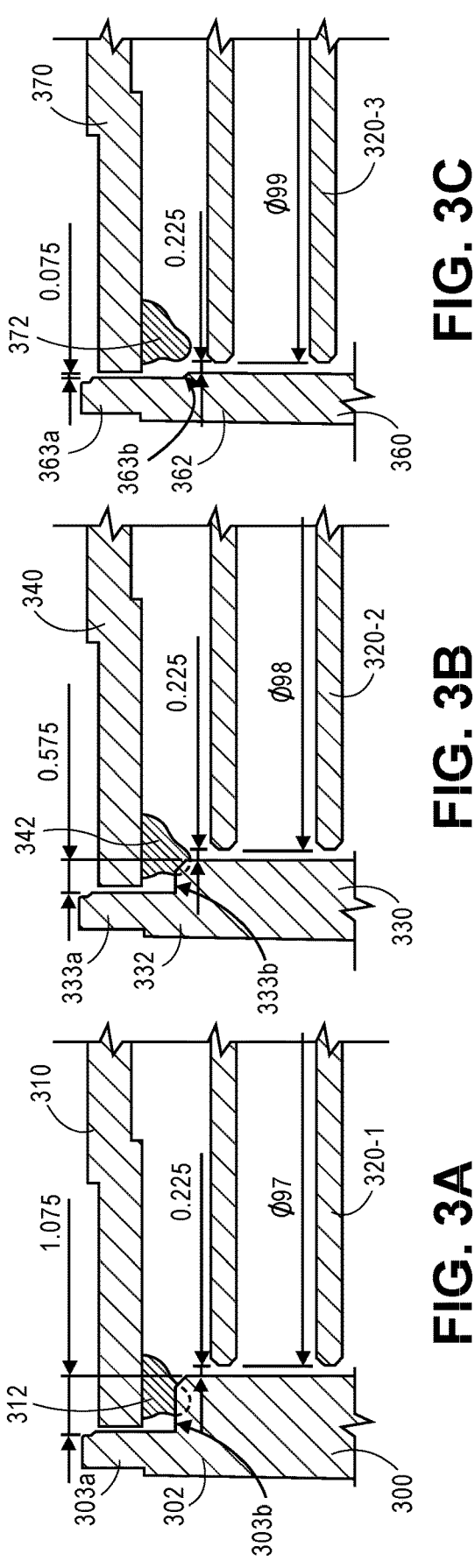
FIG. 3A is a cross-sectional side diagram illustrating a hard disk drive baseplate sealing sidewall for a 97 mm disk, according to an embodiment.
FIG. 3B is a cross-sectional side diagram illustrating a hard disk drive baseplate sealing sidewall for a 98 mm disk, according to an embodiment.
FIG. 3C is a cross-sectional side diagram illustrating a hard disk drive baseplate sealing sidewall for a 99 mm disk.

However, with progressively larger recording disk diameters, sealing by gasket becomes more and more difficult as the seat 203*b* becomes narrower and narrower. FIG. 3A is a cross-sectional side diagram illustrating a hard disk drive baseplate sealing sidewall for a 97 mm disk 320-1, according to an embodiment. In the context of a 97 mm disk, baseplate 300 comprises a sidewall 302 including a rib 303*a* and a seat 303*b* configured for seating a gasket 312 coupled with a first cover 310. Here, for example, seat 303*b* is depicted as 1.075 mm (including shroud chamfer) wide, thereby providing enough gasket compression surface to enable a suitable seat of gasket 312 with seat 303*b*. FIG. 3B is a cross-sectional side diagram illustrating a hard disk drive baseplate sealing sidewall for a 98 mm disk, according to an embodiment. In the context of a 98 mm disk 320-2, baseplate 330 comprises a sidewall 332 including a rib 333*a* and a (possible) seat 333*b* configured for seating a gasket 342 coupled with a first cover 340. Here, for example, seat 333*b* is depicted as 0.575 mm (including shroud chamfer) wide, thereby providing a slight overlap between gasket 342 with seat 333*b*. FIG. 3C is a cross-sectional side diagram illustrating a hard disk drive baseplate sealing sidewall for a 99 mm disk. In the context of a 99 mm disk 320-3, baseplate 360 comprises a sidewall 362 including a rib 363*a* and a minimal "seat" 363*b* surface for seating a gasket 372 of first cover 370. Here, for example, "seat" 363*b* is depicted as 0.075 mm (including shroud chamfer) wide, thereby not providing enough gasket compression surface to enable a suitable seat of gasket 372 with "seat" 363*b*. Thus, a conventional approach as set forth in FIGS. 3A-3C, trends towards being ineffective for sealing a first cover to a baseplate sidewall with progressively larger recording disk 320-1, 320-2, 320-3 diameters.

Figures 4A, 4B:
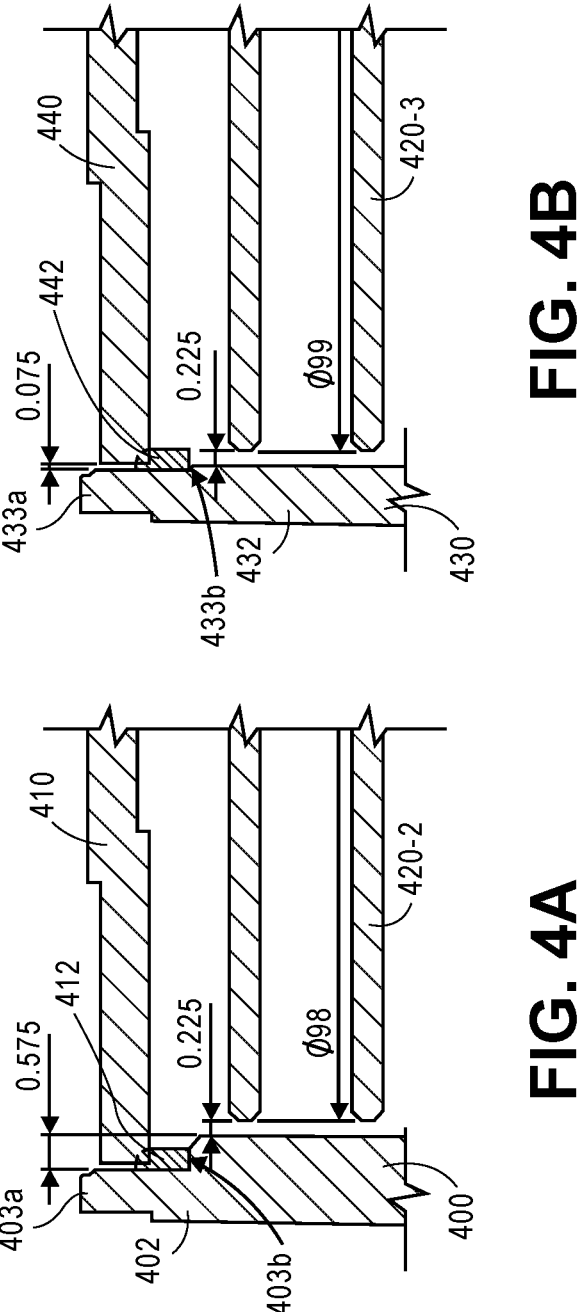
FIG. 4A is a cross-sectional side diagram illustrating a hard disk drive baseplate having a gasket applied thereon for a 98 mm disk, according to an embodiment.
FIG. 4B is a cross-sectional side diagram illustrating a hard disk drive baseplate having a gasket applied thereon for a 99 mm disk.

Another approach involves applying a gasket seal directly onto the baseplate, e.g., by employing a CIPG, rather than to the first cover. FIG. 4A is a cross-sectional side diagram illustrating a hard disk drive baseplate having a gasket applied thereon for a 98 mm disk, according to an embodiment. In the context of a 98 mm disk 420-2, baseplate 400 comprises a sidewall 402 including a rib 403*a* and a seat 403*b* configured for seating a gasket 412 coupled with a first cover 410. Here, for example, seat 403*b* is depicted as 0.575 mm (including shroud chamfer) wide, thereby providing enough gasket compression surface to enable a suitable seat of gasket 412 with seat 403*b*, e.g., with gasket 412 applied to horizontal wall of seat 403*b* and vertical wall of rib 403*a* of baseplate 400. FIG. 4B is a cross-sectional side diagram illustrating a hard disk drive baseplate having a gasket applied thereon for a 99 mm disk. In the context of a 99 mm disk 420-3, baseplate 430 comprises a sidewall 432 including a rib 433*a* and a minimal "seat" 433*b* surface for seating a gasket 442 of first cover 440. Here, for example, "seat" 433*b* is depicted as 0.075 mm (including shroud chamfer) wide, thereby not providing enough gasket compression surface to enable a suitable seat of gasket 442 with "seat" 433*b*, i.e., there is effectively no horizontal wall of seat 433*b* for seating gasket 442. Thus, the alternative approach as set forth in FIGS. 4A-4B, trends towards being ineffective for sealing a first cover to a baseplate sidewall with progressively larger recording disk 420-2, 420-3 diameters.

Embedded Gasket on Baseplate

Figures 5A, 5B:
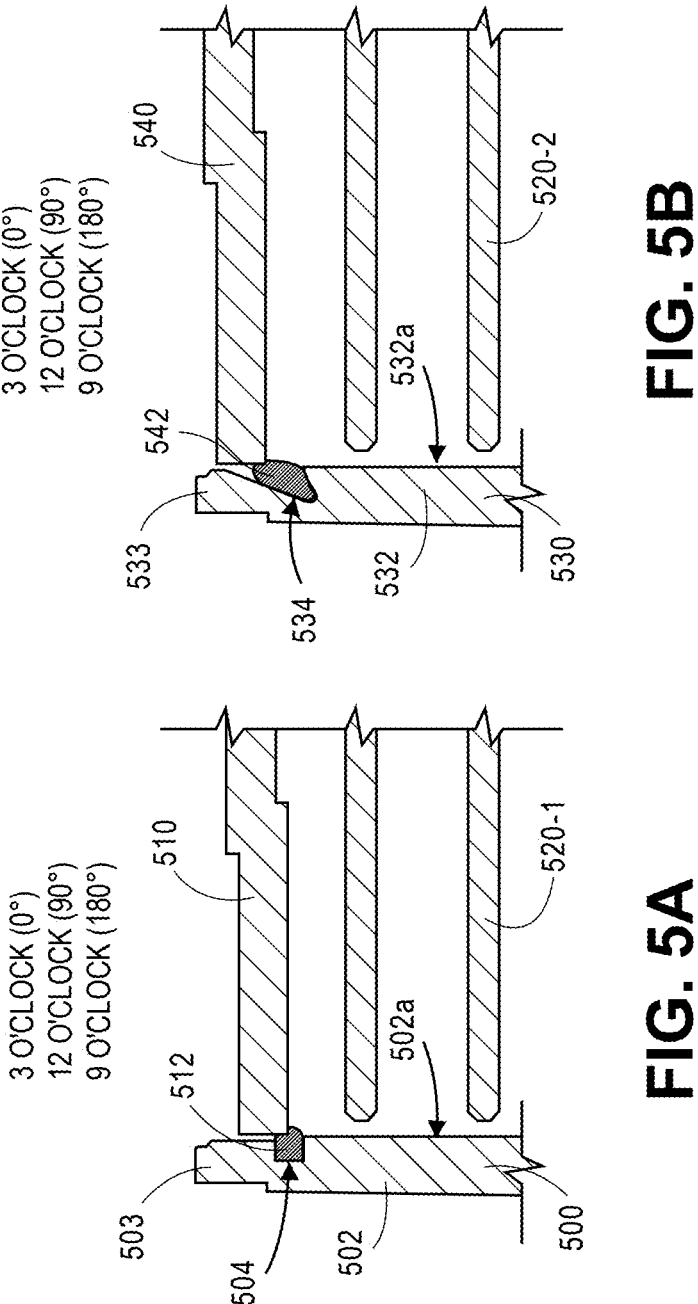
FIG. 5A is a cross-sectional side diagram illustrating a hard disk drive baseplate with embedded gasket, according to a first embodiment.
FIG. 5B is a cross-sectional side diagram illustrating a hard disk drive baseplate with embedded gasket, according to a second embodiment.
Figure 5C:
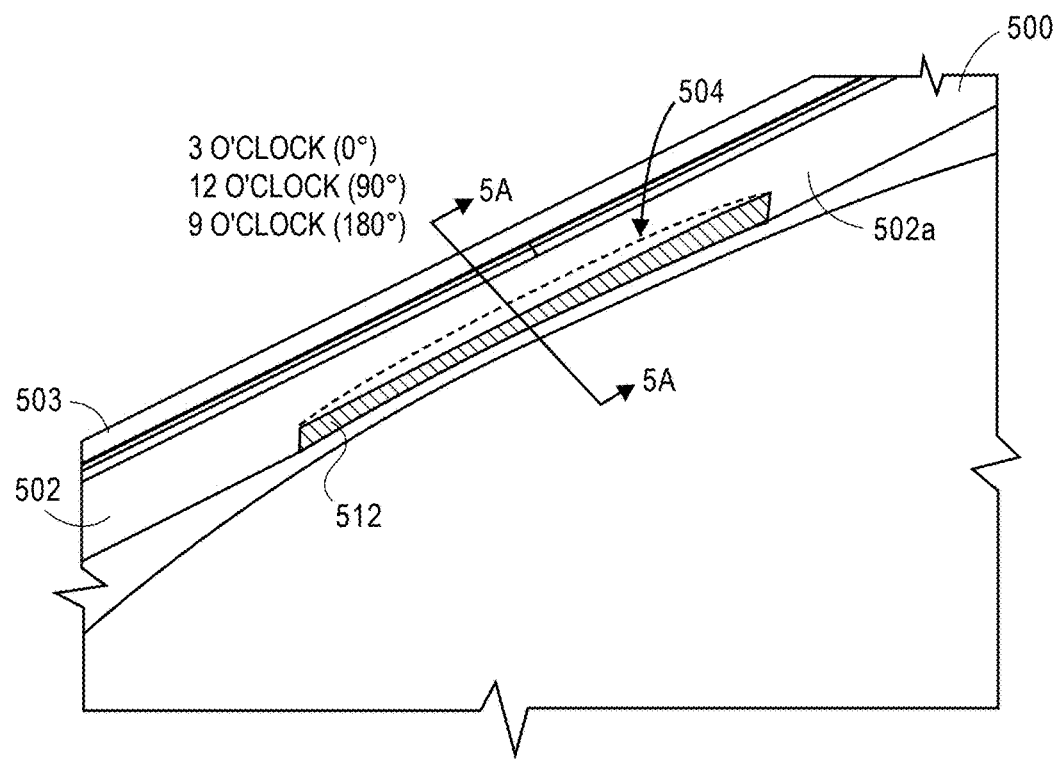
FIG. 5C is a perspective view illustrating position(s) of the embedded gasket of FIG. 5A, according to the first embodiment.

FIG. 5A is a cross-sectional side diagram illustrating a hard disk drive baseplate with embedded gasket, and FIG.

5C is a perspective view illustrating position(s) of the embedded gasket of FIG. 5A, according to a first embodiment. In the context of a recording disk 520-1 having an outer diameter greater than 97 mm (e.g., a "large diameter" disk), baseplate 500 comprises a sidewall 502 including a rib 503, and a groove 504 extending from an internal sidewall surface 502*a* into the sidewall 502, and a gasket seal 512 embedded in the groove 504. In contrast with a baseplate having a gasket applied thereon such as illustrated and described in FIGS. 4A-4B, i.e., with gasket 412 applied to horizontal wall of seat 403*b* and vertical wall of rib 403*a* of baseplate 400, here with groove 504 extending into the sidewall 502 and gasket seal 512 embedded in the groove 504, according to an embodiment the gasket seal 512 is predominantly encompassed within the groove. For example, gasket seal 512 may be encompassed at least or around 180°, or by three sides, within groove 504. The groove 504 and embedded gasket seal 512, e.g., composed of conventional gasket seal material(s), are configured for sealing a first cover 510 to the baseplate 500. According to this illustrated embodiment, the groove 504 extends into the sidewall 502 substantially normal to the sidewall surface 502*a*, and a portion of the embedded gasket seal 512 extends inward beyond the sidewall surface 502*a*, e.g., some distance into the internal cavity of baseplate 500. Hence, this configuration enables the first cover 510 to physically engage with the portion of the embedded gasket seal 512 that extends inward away from the sidewall surface 502*a*, thereby providing a suitable sealing mechanism for an HDD such as HDD 100 (FIG. 1). In the context of a recording disk 520-1 having an outer diameter of 97 mm or smaller, such a configuration may enable a disk shroud clearance of greater than 0.2 mm, or even up to around 1.0 mm or greater with instances in which a maximum disk shroud clearance is desired, e.g., such as for power consumption optimization.

Figure 5D:
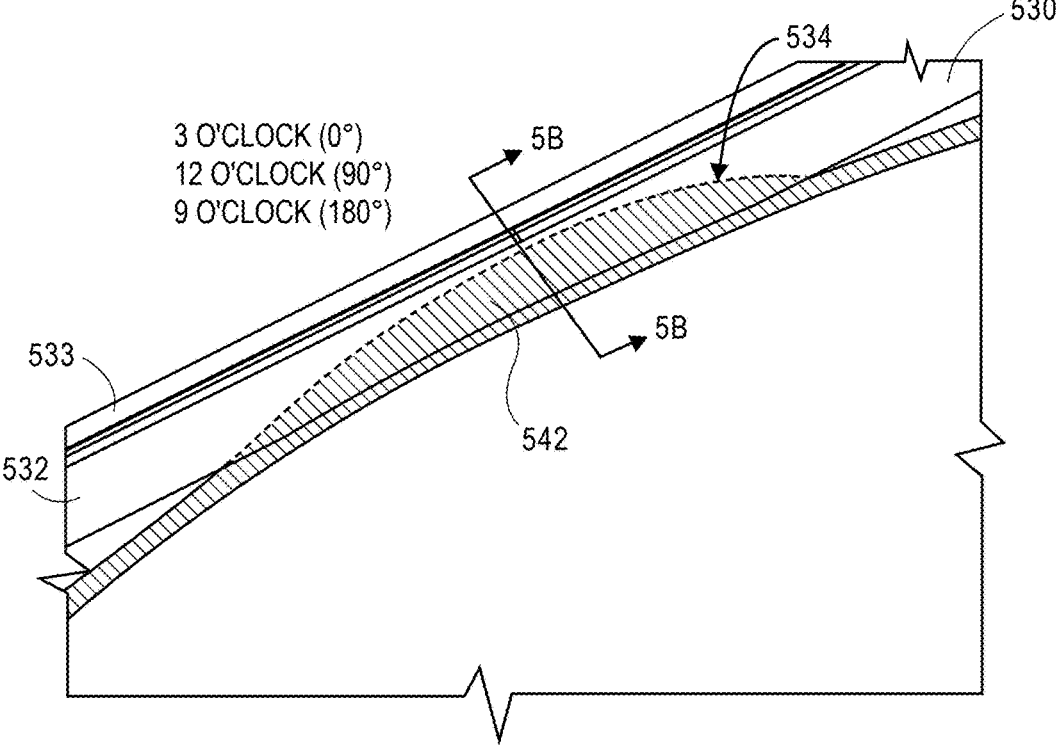
FIG. 5D is a perspective view illustrating position(s) of the embedded gasket of FIG. 5B, according to the second embodiment.

FIG. 5B is a cross-sectional side diagram illustrating a hard disk drive baseplate with embedded gasket, and FIG. 5D is a perspective view illustrating position(s) of the embedded gasket of FIG. 5B, according to a second embodiment. In the context of a recording disk 520-2 having an outer diameter greater than 97 mm (e.g., a "large diameter" disk), baseplate 530 comprises a sidewall 532 including a rib 533, and a groove 534 extending from an internal sidewall surface 532*a* into the sidewall 532, and a gasket seal 542 embedded in the groove 534. Here also in contrast with a baseplate having a gasket applied thereon such as illustrated and described in FIGS. 4A-4B, with groove 534 extending into the sidewall 532 and gasket seal 542 embedded in the groove 534, according to an embodiment the gasket seal 542 is predominantly encompassed within the groove. For example, gasket seal 542 may be encompassed at least or around 180°, or by three sides, within groove 534. The groove 534 and embedded gasket seal 542, e.g., composed of conventional gasket seal material(s), are configured for sealing a first cover 540 to the baseplate 530. According to this illustrated embodiment, the groove 534 extends into the sidewall 532 at a downward angle (e.g., toward the "floor" as in FIG. 2A) from the sidewall surface 532*a*, and a portion of the embedded gasket seal 542 extends inward beyond the sidewall surface 532*a*, e.g., some distance into the internal cavity of baseplate 530. Here also, this configuration enables the first cover 540 to physically engage with the portion of the embedded gasket seal 542 that extends inward away from the sidewall surface 532*a*, thereby providing a suitable sealing mechanism for an HDD such as HDD 100 (FIG. 1). Here also, in the context of a recording disk 520-2 having an outer diameter of 97 mm or smaller, such a configuration may enable a disk shroud clearance of greater than 0.2 mm, or even up to around 1.0 mm or greater with instances in which a maximum disk shroud clearance is desired, e.g., such as for power consumption optimization.

Method of Manufacturing a Hard Disk Drive Enclosure Base

FIG. 6 is a flowchart illustrating a method of manufacturing a hard disk drive enclosure base, according to an embodiment. For example, the manufacturing method of FIG. 6 may be used to manufacture an HDD enclosure base such as base 500 (FIG. 5A), 530 (FIG. 5B).

At block 602, form a groove extending from an internal sidewall surface into the sidewall of a hard disk drive enclosure base. For example, groove 504 (FIG. 5A), 534 (FIG. 5B) is formed, e.g., cast, machined, or the like, to extend from an internal sidewall surface 502a (FIG. 5A), 532a (FIG. 5B) into the sidewall 502 (FIG. 5A), 532 (FIG. 5B) of a hard disk drive (see, e.g., HDD 100 of FIG. 1) enclosure base 200 (FIG. 2A), 500 (FIG. 5A), 530 (FIG. 5B) (see also, e.g., HDD housing 168 of FIG. 1). According to an embodiment, forming the groove includes forming the groove to extend into the sidewall substantially normal to the sidewall surface, with reference to FIG. 5A. According to another embodiment, forming the groove includes forming the groove to extend into the sidewall at a downward angle from the sidewall surface, with reference to FIG. 5B.

At block 604, embed a gasket seal into the groove. For example, gasket seal 512 (FIG. 5A), 542 (FIG. 5B) is embedded, e.g., adhered, press-fit, or the like, into groove 504, 534. According to embodiments, forming the groove (e.g., block 602) and embedding the gasket seal (e.g., block 604) are performed at a plurality of discrete positions along the sidewall of the base. According to related embodiment, these positions are a 0° position, a 90° position, and a 180° position of the base. According to an embodiment, embedding the gasket seal includes embedding the gasket seal such that a portion of the gasket seal extends inward beyond the sidewall surface, such as with each configuration of FIGS. 5A-5B.

Hence, such a baseplate 500, 530 comprising an embedded gasket seal 512, 542 enables a first cover 510 (FIG. 5A), 540 (FIG. 5B), e.g., having a substantially planar surface approaching the edges, to physically engage with at least the portion of the embedded gasket seal 512, 542 that extends inward away from the sidewall surface 502a, 532a. Therefore, this approach provides a suitable sealing mechanism for an HDD such as HDD 100 (FIG. 1), even in view of larger diameter disks (e.g., greater than 97 mm) and corresponding expanded disk shrouds. These approaches and configurations are likewise applicable to conventional disk diameters (e.g., 97 mm and less), therefore providing larger disk shroud clearances (e.g., in an approximate range of 0.2 mm-1.0 mm), enabling relatively lower power consumption.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
a disk medium rotatably mounted on a spindle;
a head slider housing a read-write transducer configured to read from and to write to the disk medium;
an actuator configured for moving the head slider to access portions of the disk medium; and
an enclosure base comprising:
    a groove extending from an internal surface of a sidewall into the sidewall, and
    a gasket seal embedded and encompassed at least 180 continuous degrees within the groove;
    wherein the groove and the embedded gasket seal are discretely positioned at each of a 0° position, a 90° position, and a 180° position of the base.

2. The HDD of claim 1, further comprising:
a first cover coupled to the base;
wherein the embedded gasket seal is configured to seal an interface between the first cover and the base.

3. The HDD of claim 1, further comprising:
a first cover coupled to the base;
wherein:
    the groove extends into the sidewall substantially normal to the sidewall surface,
    a portion of the embedded gasket seal extends inward beyond the sidewall surface, and
    an outer edge of the first cover physically engages with the portion of the embedded gasket seal that extends inward beyond the sidewall surface.

4. The HDD of claim 1, further comprising:
a first cover coupled to the base;
wherein:
    the groove extends into the sidewall at a downward angle from the sidewall surface,
    a portion of the embedded gasket seal extends inward beyond the sidewall surface, and an outer edge of the first cover physically engages with the portion of the embedded gasket seal that extends inward beyond the sidewall surface.

5. The HDD of claim 1, wherein the disk medium has a diameter greater than 97 millimeters.

6. The HDD of claim 1, wherein the disk medium has a diameter less than or equal to 97 millimeters and a disk shroud clearance greater than 0.2 millimeter.

7. The HDD of claim 1, wherein the disk medium has a diameter less than or equal to 97 millimeters and a disk shroud clearance greater than or equal to 1.0 millimeter.

8. The HDD of claim 1, further comprising a lighter-than-air gas contained therein.

9. An enclosure base for a hard disk drive (HDD), the base comprising:

a groove extending from an internal surface of a sidewall into the sidewall; and a gasket seal embedded and encompassed at least 180 continuous degrees within the groove;

wherein the groove and the embedded gasket seal are discretely positioned at each of a 0° position, a 90° position, and a 180° position of the base.

10. The base of claim 9, wherein:

the groove extends into the sidewall substantially normal to the sidewall surface; and a portion of the embedded gasket seal is configured to extend inwardly beyond the sidewall surface to provide a seal seat for an outer edge of an HDD cover.

11. The base of claim 9, wherein:

the groove extends into the sidewall at a downward angle from the sidewall surface; and a portion of the embedded gasket seal is configured to extend inwardly beyond the sidewall surface to provide a seal seat for an outer edge of an HDD cover.

12. A method of manufacturing a hard disk drive enclosure base, the method comprising:

forming a groove extending from an internal surface of a sidewall of the base into the sidewall at each of a discrete 0° position, a discrete 90° position, and a discrete 180° position of the base; and embedding, and encompassing at least 180 continuous degrees, a gasket seal into the groove at each of the discrete 0° position, the discrete 90° position, and the discrete 180° position of the base.

13. The method of claim 12, wherein:

forming the groove includes forming the groove to extend into the sidewall substantially normal to the sidewall surface; and embedding the gasket seal includes embedding the gasket seal such that a portion of the gasket seal extends inward beyond the sidewall surface.

14. The method of claim 12, wherein:

forming the groove includes forming the groove to extend into the sidewall at a downward angle from the sidewall surface; and embedding the gasket seal includes embedding the gasket seal such that a portion of the gasket seal extends inward beyond the sidewall surface.

* * * * *